US006411887B1

(12) United States Patent
Martens et al.

(10) Patent No.: US 6,411,887 B1
(45) Date of Patent: Jun. 25, 2002

(54) METHOD AND APPARATUS FOR REMOTELY CONTROLLING MOTOR VEHICLES

(75) Inventors: Daniel Martens; Larry Martens; Bryan E. Markle, all of Nepean (CA)

(73) Assignee: P-CEL Research Inc. (CA)

( * ) Notice: Subject to any disclaimer, the term of this patent is extended or adjusted under 35 U.S.C. 154(b) by 0 days.

(21) Appl. No.: 09/564,228

(22) Filed: May 3, 2000

(30) Foreign Application Priority Data

Nov. 22, 1999 (CA) .......................................... 2290274
Dec. 10, 1999 (CA) .......................................... 2292280

(51) Int. Cl.[7] .......................... G06F 19/00; B60T 7/18

(52) U.S. Cl. ....................... 701/115; 180/167; 340/902; 340/989

(58) Field of Search ................................ 123/478, 480, 123/486; 701/1, 2, 25, 101, 102, 103, 104, 105, 115, 117; 180/167, 168, 169, 287; 340/425.5, 438, 463, 468, 902, 989; 307/10.1, 10.2, 10.3, 10.4, 10.5

(56) References Cited

U.S. PATENT DOCUMENTS

| | | | | | |
|---|---|---|---|---|---|
| 3,580,353 | A | | 5/1971 | Thompson | 180/167 |
| 4,023,138 | A | | 5/1977 | Ballin | 340/539 |
| 4,067,411 | A | | 1/1978 | Conley et al. | 180/169 |
| 4,660,528 | A | | 4/1987 | Buck | 123/333 |
| 4,742,357 | A | | 5/1988 | Rackley | 342/457 |
| 4,818,998 | A | | 4/1989 | Apsell et al. | 342/444 |
| 4,908,629 | A | | 3/1990 | Apsell et al. | 342/457 |
| 4,918,425 | A | | 4/1990 | Greenberg et al. | 340/539 |
| 5,276,728 | A | | 1/1994 | Pagliaroli et al. | 455/404 |
| 5,382,948 | A | | 1/1995 | Richmond | 340/825.36 |
| 5,515,285 | A | | 5/1996 | Garrett, Sr. et al. | 701/300 |
| 5,532,690 | A | | 7/1996 | Hertel | 340/989 |
| 5,703,598 | A | | 12/1997 | Emmons | 342/357.07 |
| 5,769,051 | A | * | 6/1998 | Bayron et al. | 701/115 |
| 5,808,564 | A | | 9/1998 | Simms et al. | 340/990 |
| 5,815,822 | A | | 9/1998 | Iu | 701/2 |
| 5,861,799 | A | | 1/1999 | Szwed | 340/425.5 |
| 5,937,065 | A | | 8/1999 | Simon et al. | 380/262 |
| 5,939,975 | A | | 8/1999 | Tsuria et al. | 340/426 |
| 5,983,156 | A | * | 11/1999 | Andrews | 701/115 |
| 5,999,876 | A | * | 12/1999 | Irons et al. | 701/115 |
| 6,112,152 | A | * | 8/2000 | Tuttle | 701/115 |

FOREIGN PATENT DOCUMENTS

| | | |
|---|---|---|
| CA | 2214907 | 10/1998 |
| GB | 2 272 787 | 5/1994 |
| WO | WO 94/25936 | 11/1994 |
| WO | WO 98/30421 | 7/1998 |
| WO | WO 99/43513 | 9/1999 |

* cited by examiner

*Primary Examiner*—Willis R. Wolfe
(74) *Attorney, Agent, or Firm*—Gowling Lafleur Henderson LLP

(57) ABSTRACT

In the Police Chase Eliminator (PCEL), a targeted vehicle being pursued through traffic may be apprehended by first identifying vehicles in the vicinity of the targeted vehicle, following the targeted vehicle until it is the only vehicle remaining of the originally identified vehicles, and then apprehending the targeted vehicle. This process may also be carried out by first identifying a select group of vehicles using vehicle descriptor limitations. The system for remotely controlling a targeted vehicle comprises a control unit which would normally be located in a police car and vehicle modules which are installed in motor vehicles. The control unit transmits activate commands to the vehicle modules which respond by either transmitting back a visual signal or an electronic signal. The control unit may also transmit control commands to the vehicle modules to control the operation of the vehicle. The activate control commands may include a vehicle "Find" command and/or a vehicle "Flash" command. The vehicle "Find" command seeks an electronic response identifying a vehicle by it descriptors which may include vehicle VIN, vehicle type, vehicle color and vehicle make. The vehicle "Flash" command initiates a visual indicator response from the vehicle such as the operation of its four-way flashers. The control commands include, a vehicle "Slow" command for causing the vehicle to slow down, a vehicle "Stop" command for causing the vehicle to stop and a vehicle "Reset" command for resetting the vehicle module.

17 Claims, 6 Drawing Sheets

METHOD AND APPARATUS FOR REMOTELY CONTROLLING MOTOR VEHICLES

FIELD OF THE INVENTION

The invention relates generally to the remote control of motor vehicles by law enforcement officers, and more particularly to the selective control of motor vehicles in emergency situations.

BACKGROUND OF THE INVENTION

Since the invention of the automobile, high-speed pursuits have been a fact of life. Many police officers, criminal suspects and innocent motorists/pedestrians are killed or injured annually when criminals attempt to avoid arrest by trying to outrun police vehicles. In the past police officers have discharged firearms at fleeing vehicles, used spike belts to flatten tires, rammed suspect vehicles to force them off the road, and used other desperate measures. These have met with little success, and most methods attempted have proved extremely dangerous to those involved.

The dilemma faced by authorities is that they have no way to effectively apprehend the motoring criminal without endangering the general public, yet they have a sworn duty to stop dangerous drivers and remove them from the road. Many devices have been tried over the years, but with minimal success. The most popular and enduring was the spike belt, a rubber mat containing a number of sharp spikes which, when stretched across the roadway, would deflate some or all the tires on a suspect vehicle. The only problem was that the police seldom managed to get ahead of the suspect as their vehicles were not fast enough and the suspect's direction of travel was seldom predictable. They could lay out spike belts where it appeared the suspect might go, only to have the target vehicle take another route. This method, although still in use, is in danger of losing what little effect it has because of a new type of tire that cannot be deflated. The police have a serious problem. They have to stop speeding vehicles from endangering the public, but they have no safe and effective way of doing it.

U.S. Pat No. 4,660,528 which issued to Gene Buck on Apr. 28, 1987, describes an RF transmitter for terminating the normal operation of a selected motor vehicle by curtailing the vehicle's fuel supply or removing ignition voltage to the engine. The vehicle receiver is tuned to a frequency and code specific to its license plate indicia which is very unreliable when one is dealing with stolen vehicles bearing stolen license plates. As well, police officers pursuing vehicles at high speeds often are unable to visually obtain a license number.

U.S. Pat. No. 3,580,353 which issued to Kermith Thomson on May 25, 1971 describes a fuel cutoff device activated by remote radio transmission. The radio transmission is not vehicle specific, thereby causing all vehicles within radio range to be immobilized if they are equipped with the cutoff mechanism.

U.S. Pat. No. 5,276,728 which issued to Pagliaroli et al on Jan. 4, 1994 outlines a system for disabling or enabling an automobile via signals transmitted over cellular telephone networks. This method can only be used in areas with cellular coverage; once again, the target vehicle can only be identified by license number which is unreliable if obtainable.

Canadian Patent Application No.2214907 filed on Oct. 28, 1997 by Canie et al and opened to public inspection on Apr.28, 1999 describes a remote means of interrupting the fuel supply of a target vehicle by using a hand-held laser gun. Once again, this device is not vehicle specific and has failed to gain credibility with either legislators or the police community.

None of the foregoing describe a system capable of pinpointing one specific vehicle in heavy freeway traffic, then slowing it down and stopping it safely without affecting or endangering nearby traffic.

Therefore, there remains an acute need for a system which police can use to selectively control motor vehicles in emergency situations such as in high-speed pursuits.

SUMMARY OF THE INVENTION

The invention is directed to a method and apparatus for remotely identifying and/or controlling vehicles. In accordance with one aspect of the invention, a targeted vehicle being pursued through traffic may be apprehended by first identifying the vehicles in the vicinity of the targeted vehicle, following the targeted vehicle until it is the only vehicle remaining of the originally identified vehicles, and then apprehending the targeted vehicle. This process may also be carried out by first identifying a select group of vehicles using vehicle descriptor limitations.

The system for remotely controlling a vehicle in accordance with the present invention comprises a control unit which would normally be located in a police car and vehicle modules which are installed in motor vehicles. The control unit transmits activate commands to the vehicle modules which respond by either transmitting back a visual signal or an electronic signal. The control unit may also transmit control commands to the vehicle modules to control the operation of the vehicle. The activate control commands may include a vehicle "Find" command and/or a vehicle "Flash" command. The vehicle "Find" command seeks an electronic response identifying a vehicle by it descriptors which may include vehicle VIN, vehicle type, vehicle color and vehicle make. The vehicle "Flash" command initiates a visual indicator response from the vehicle such as the operation of its four-way flashers. The control commands include a vehicle "Slow" command for causing the vehicle to slow down, a vehicle "Stop" command for causing the vehicle to stop and a vehicle "Reset" command for resetting the vehicle module.

In accordance with a further aspect of the present invention, the vehicle module may include communications circuits for receiving commands from the control unit and for transmitting to the control unit, a processor for processing the commands, memory associated with the processor for storing descriptors of the vehicle in which the module is installed and a controller for controlling the vehicle visual indicator and a vehicle control in response to the commands. The vehicle visual indicator may be the four-way flashers. The vehicle control may be the vehicle ignition circuits and/or fuel system.

In accordance with another aspect of the invention, the control unit may include communications circuits for transmitting command signals to the vehicle, a processor for processing the transmitted signals, a memory associated with the processor and an interface for providing instructions to the processor. The interface may include input devices for providing vehicle descriptors to the control unit processor for encoding into the transmitted command signals and input devices for providing activate and control commands to the control unit processor for encoding into the transmitted command signals.

In accordance with more specific aspects of the invention, the interface may include a keyboard for inputting instructions to the processor and a display screen for displaying the vehicle descriptor received from a vehicle. In addition, the interface may include a cartridge slot and a removable panic button cartridge which is used to communicate with the control unit to provide it with limited specific instructions to transmit command signals to a vehicle. The control unit interface further includes data receiving device for receiving data from a central computer. The data receiving device can take the form of a coupler for connecting a cable to the central computer, a disc drive for receiving a data disc or a wireless transceiver for receiving signals from a central computer.

In accordance with a further aspect of this invention, a method of using the remote control system includes the steps of transmitting activate command signals to the vehicles in the vicinity of the targeted vehicle and receiving their response, following the targeted vehicle until it is the only vehicle responding to the activate command signal and then controlling the operation of the targeted vehicle by a control command signal. The response given by the targeted vehicle to the activate signal may include a visual response or an electronic response providing the vehicle's descriptors.

A further method for remotely controlling vehicles in traffic may include transmitting activate command signals to the vehicles in the vicinity of the control unit to activate the vehicles' visual indicators. which may be followed by a command to control the operation of the targeted vehicle by a control command signal which may be a vehicle "Slow" command for causing the vehicle to slow down and a vehicle "Stop" command for causing the vehicle to stop.

A method for remotely identifying vehicles in traffic may include transmitting activate command signals to the vehicles in the vicinity of the control unit to cause the vehicles to transmit their vehicle descriptors to the control unit.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

In order for law enforcement officers to safely apprehend suspects in a motor vehicle, the vehicle must be targeted and then made to slow down and stop in a manner that does not compromise the safety of the public, the officers and the suspects. In a Police Chase Eliminator (PCEL) system in accordance with the present invention, all new and used vehicles are fitted with a vehicle PCEL module that responds to signals from a remote PCEL control unit to control the vehicle. When a pursuit is initiated by a law enforcement officer, a signal is transmitted to every vehicle or a selected group of vehicles in the vicinity where the suspect vehicle is located. Through either visual or electronic responses from the vehicles in the vicinity of the suspect vehicle, the enforcement officer is able to narrow down the number of vehicles responding to him to preferably only the targeted vehicle, though at times, it may occur that 2 or more vehicles remain close enough together so that they will all respond. At this point, the officer signals the responding vehicle(s) to slow or stop at an appropriate place as determined by the officer. Both the provision of the initial visual or electronic responses and the control of the vehicle to slow or stop is done automatically by the vehicle module and is totally out of the control of the driver of the targeted vehicle.

This invention enables police officers to quickly select a single vehicle from heavy traffic and immobilize it to different degrees almost immediately, thereby avoiding high-speed pursuits and their inherent dangers. This can be done without visually identifying unique aspects of the vehicle such as license plate numbers, and in certain embodiments, the police can isolate a single vehicle even if they have had little or no visual contact with the targeted vehicle.

Figure 1:
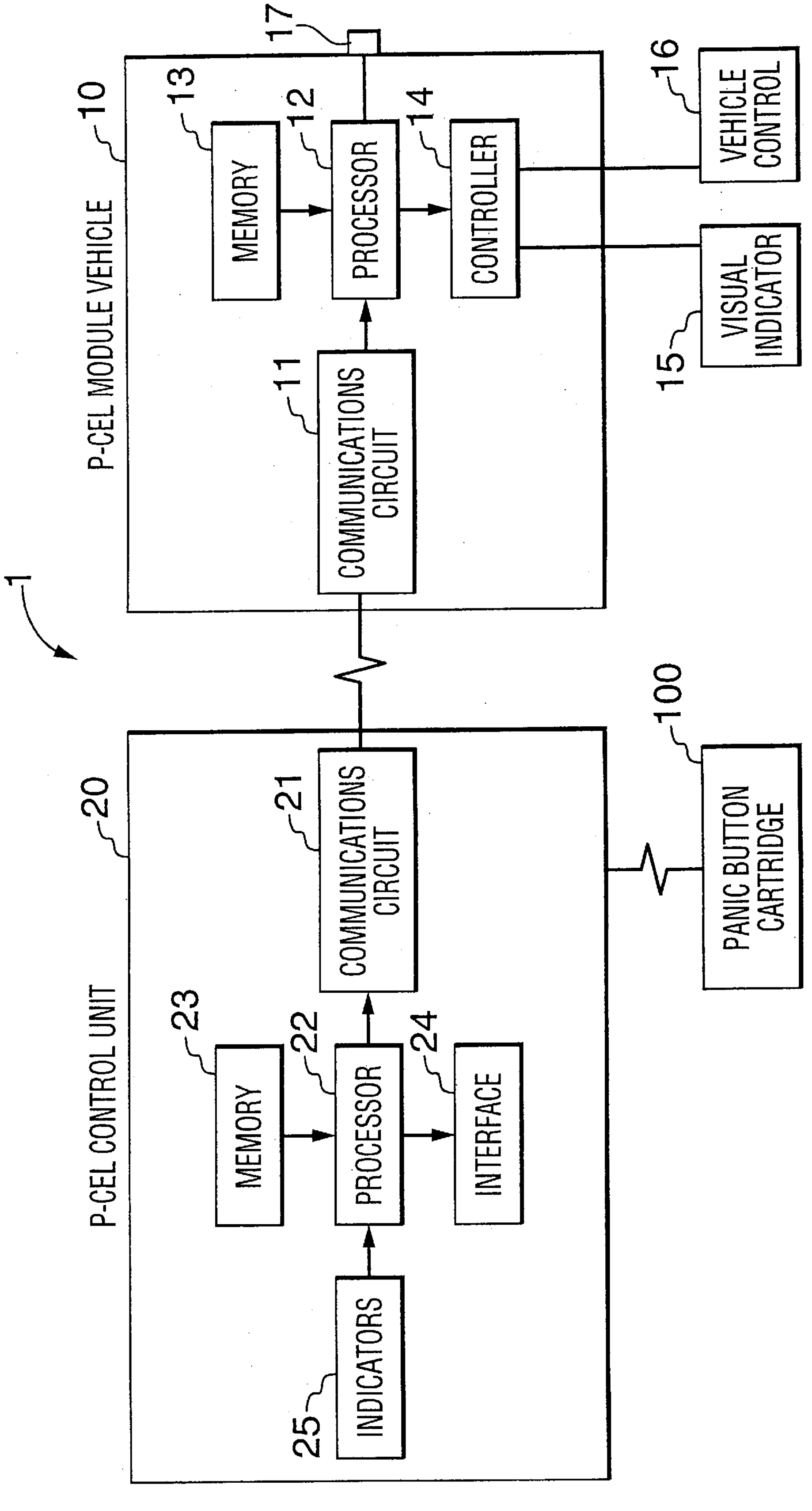
FIG. 1 schematically illustrates one embodiment of a Police Chase ELiminator (PCEL) system with a vehicle module and a control unit in accordance with the present invention.

The PCEL system 1 comprises a vehicle module 10 and a remote control unit 20 as illustrated in FIG. 1. A vehicle module 10 is installed in each new vehicle at the factory, or as a retrofit in the case of existing vehicles, and is powered by the vehicle's battery. Module 10 includes a communications circuit 11, a microprocessor 12, a memory 13, and a controller 14.

Control units 20 would usually be installed in police cars as a separate unit or integrated into the normal police car computer unit. Control units 20 include a communications circuit 21, a microprocessor 22, a memory 23, a user interface 24 and indicators 25 for the operator.

The communications circuits 11 and 21 are constructed to be able to communicate with one another for receiving and transmitting encrypted signals between the control unit 20 and vehicle modules 10. The communications circuits 11 and 21 may communicate by any of a variety of well known methods such as audio, ultrasonic, optical or RF, however in the preferred embodiment RF signals at a selected frequency are used. The communications circuit 11 will generally broadcast a strong signal 360° about the vehicle. However, the communications circuit 21, as will become clear later, is designed to transmit a weaker signal such that only the vehicle modules 10 in the vicinity of the targeted vehicles and within a limited distance such as 300 to 500 feet from the control unit 20, will respond. The communications circuit 21 may also have a directional antenna allowing the beam direction and the beam width to be adjusted. Additionally, the communications circuit 21 may be controlled to vary the signal strength.

The microprocessor 12 in the vehicle module 10 is used to receive instructions from the control unit 20 and carry out those instructions. In response to the instructions, the vehicle module may transmit vehicle identification data stored in memory 13 or it may carry out certain vehicle control functions through controller 14. Controller 14 is hard wired to one or more of the vehicle's indicators 15 as well as one or more of the vehicle controls 16. For instance, controller 14 may be used to have the vehicle's four-way flashers operate continuously or periodically on command while the ignition is on. Then again the head lights, travel lights and/or the horn may be made to operate to provide a signal to the enforcement officer in the police car or as a warning to the driver of the vehicle. Further, the controller 14 is used to affect the vehicle controls 16 which may include such things as a reduction in fuel flow and/or in the power to the vehicle's ignition circuit.

When the vehicle's module 10 is installed into the vehicle, it is programmed on a one-time only basis with data being inserted into the memory 13. This data could include the host vehicle's serial or identification number (VIN) which is normally 17 digits and is as unique as a fingerprint. In addition, specific vehicle descriptors such as color, year, make and vehicle type are added to memory 13.

The VIN is the only identifiable denominator that is common to all motor vehicles produced worldwide. In North America, the VIN has been standardized; each VIN contains the following 17 digits which each represent a characteristic of the vehicle. One or more examples of each digit are given:

| | | |
|---|---|---|
| 1st Digit - Country of Manufacture | 1 = U.S. | 2 = Canada |
| 2nd Digit - Manufacturer | B = AMC Canada | J = Jeep |
| 3rd Digit - Type | C = MPV | T = Truck |
| 4th Digit - Engine type and size | C = 6–258 | N = V8–360 |
| 5th Digit - Transmission/Transfer Case | A = 3 = speed Auto Column Shift | |
| 6th and 7th Digits - Nameplate/Body Style | 26 = J-10 Truck - 109" Wheelbase | |
| 8th Digit - GVWR (Gross Weight) | C = 6200 | |
| 9th Digit - Check Digit - | to verify accuracy of transcription of VIN | |
| 10th Digit - Model Year | G = 1986 | |
| 11th Digit - Plant Code | B = Brampton | T = Toledo |
| 12th thru 17th Digits - Sequential Ser. No. | Starts with 000,001 | |

It is preferred that the vehicle modules 10 be standardized for a specific system. All modules 10 will have a minimum number of functions and can be accessed by control units 20. On the other hand, the control units 20 may vary somewhat in their functionality; however their communications circuits 21 must operate in the standard communication mode and wavelength specific to the vehicle modules 10. The microprocessor 22 under the control of the user interface 24 generates control signals to be sent to the vehicle modules 10. Memory 23 may contain operating data such as the operator's password, stolen vehicle VIN's and the like. Indicators 25 provide the status of the control unit 20 to the operator; they may be audible or visual, such as buzzers or colored lights, and may include a display screen to display information.

The control unit 20 has two main functions, the first is to narrow down the number of vehicles with which it is communicating to only the targeted vehicle being pursued and the second is to then communicate control signals to that specific vehicle. These functions may be carried out in several ways.

Figure 2:
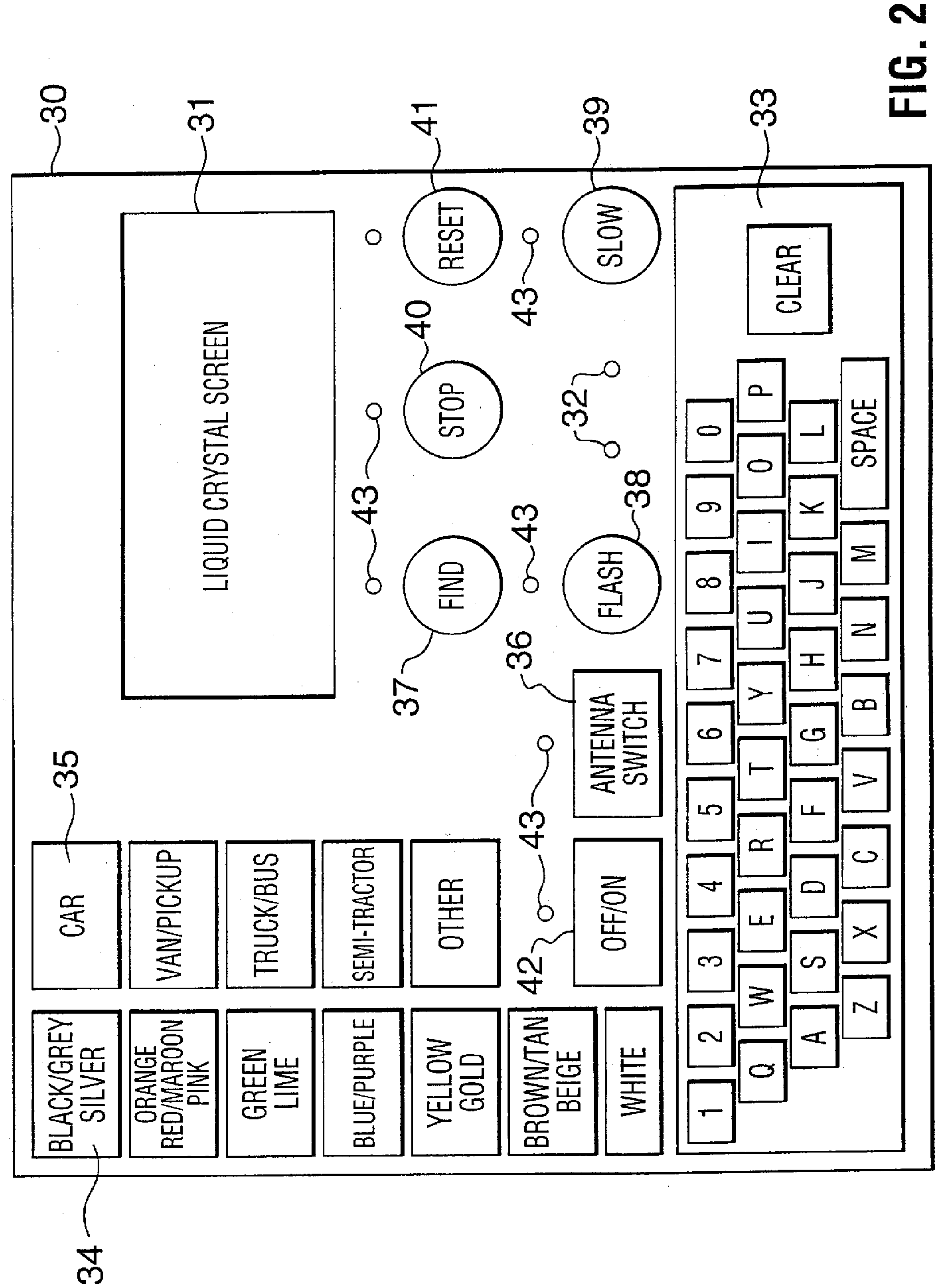
FIG. 2 illustrates a faceplate for the control unit in the FIG. 1 system.

In a first embodiment of the present invention, the control unit 20 takes advantage of the complete capability of the vehicle modules 10. An example of the faceplate 30 of the control unit 20 is illustrated in FIG. 2. It includes a number of indicator colored lights 32 as well as a display screen 31 such as a liquid crystal display to provide the operator status information. The faceplate 30 further includes a keyboard 33, a power On/Off switch 42, a number of selection keys 34 and 35 for selecting the color or vehicle type respectively for the vehicle being pursued and an antenna control switch 36 to point a directional antenna in the direction of the vehicle in question. The seven color keys 34 are identified as black/grey/silver, red/orange/maroon/pink, green/lime, blue/purple, yellow/gold, brown/tan/beige and white; the five vehicle type keys 35 are identified as car, van/pickup, truck/bus, semi-tractor and other. These selection keys 34 and 35 will be standardized for a particular system.

The faceplate 30 further has a number of control keys including a "Find" key 37, a "Flash" key 38, "Slow" key 39, a "Stop" key 40 and a "Reset" key 41. The "Find" key 37 initiates the process of isolating a targeted vehicle by sending out a wake-up command and a request for the vehicle's VIN and descriptors; the vehicle modules 10 of all vehicles in the range of the control unit 10 respond by becoming activated and then return a signal including their VIN and their specific vehicle descriptors to the control unit 20. The "Flash" key 38 can also initiate the process of isolating a targeted vehicle by sending out a wake-up command and a command to the vehicle module 10 to initiate the visual indicator 15 in vehicles that are within range of the control unit 20 to be activated. The visual indicator 15 will generally be the vehicle's four-way flashers. Once again, if the vehicle module 10 doesn't receive a further command from the control unit 20 for a short period, such as one minute, the vehicle module will return to its dormant state. The vehicle module 10 will not respond to any other command if it isn't in the "activated" state, and will only remain in the activated state for a predetermined period of time unless it receives other command signals.

The "Slow" key 39 sends a command to activated vehicle modules 10 within the range of the control unit 20 to cause the activated vehicle(s) to slow down; the command is carried out automatically by the controller 14 in the module 10. Again, if the vehicle module 10 doesn't receive a further command from the control unit 20 for a short period, such as one minute, the vehicle module 10 will return to its dormant state allowing the vehicle to continue on its way. The "Stop" key 40 sends a command to activated vehicle modules 10 within the range of the control unit 20 to cause the activated vehicle(s) to stop; the command is carried out automatically by the controller 14 in the module 10 usually by stopping the vehicle engine. When a vehicle receives the stop command, it would normally remain disabled for a longer fixed period of time, however in addition or alternately, the control unit 20 may be programmed to send out stop commands periodically to assure that the vehicle remains disabled. The "Reset" key 41 sends out a command to activated vehicle modules 10 within the range of the control unit 20 to return them to their dormant state, whereby the vehicles can be operated normally. The reset command can be sent at any time to release control of the activated vehicle modules.

All of the switches and keys 34 to 42 may individually be associated with an indicator light 43 or may be backlit to indicate their status.

When an enforcement officer encounters a vehicle which he wishes to investigate, he will proceed through the normal police procedures for doing so. However once it is evident that the vehicle in question refuses to stop and a pursuit is necessary, he will switch on the control unit 20 and push the "Find" key 37. The control unit 20 emits encrypted RF radio signal commands waking-up and calling for responses from either all vehicles or a select group of vehicles within radio range. The selection of a group of vehicles being interrogated may be made by pressing any one of keys 35 if the officer has visually identified the vehicle type or any one of keys 34 if the vehicle color has been identified. If a group of vehicles has not been selected, the vehicle modules 10 of all vehicles in the range of the control unit signal will respond by transmitting a signal back to the control unit 20 identifying themselves by their VIN and /or their vehicle descriptors. If a group of vehicles has been selected by one or more vehicle descriptors, then only the group selected will recognize themselves from the data in their memory 13 and will transmit their VIN and /or vehicle descriptors back to the control unit 20. The control unit 20 collates these response signals. In order to limit the amount of information it has to digest, the microprocessor 22 will record only the last four digits of the VIN responses it receives. The control unit 20 repeats its "Find" command signal and all responses are recorded, then compared to earlier responses to determine which vehicles have responded to all successive commands. This polling activity continues uninterrupted with the polling, receiving and recording of responses and comparing polling results until it isolates a single 4-digit number which has responded throughout the time period while all other vehicles have entered and exited radio range. At this point the control unit 20 will record the complete response received from the target vehicle, place it in memory 23 and display its full VIN and vehicle descriptors on the screen 31, simultaneously activating the green light 32 and/or audible alarm on the instrument panel 30 to indicate that it has isolated the target vehicle. If, during the polling procedure, no single VIN is identified, it would be an indication that the targeted vehicle does not have a functioning vehicle module 10.

Having identified a single VIN, the police officer can then verify that the isolated VIN and vehicle descriptors correspond to the vehicle being pursued while keeping the targeted vehicle under surveillance. He may also signal the vehicle to slow down or stop by pressing the "Slow" button 39 or the "Stop" button 40 on his console. The slow or stop signal from the control unit 20 may also be transmitted with a VIN component such that only the vehicle with the specific VIN will recognize the signal and cause its controller 14 to control the vehicle. However, only vehicles with activated vehicle modules 10 in the vicinity can respond to simple slow or stop command signals.

Once satisfied that the targeted vehicle is isolated, the officer will then determine when to press the "Slow" button to begin the immobilization process. The control unit 20 will emit a sequence of commands to the vehicle module 10 which will cause the target vehicle's four-way flashers to engage and the engine to steadily lose power. This provides the driver an opportunity to pull over to the shoulder of the road without unnecessarily endangering himself or surrounding traffic. The engine will continue to run at steadily reducing RPM's so that the power steering and brakes continue to function normally, but with insufficient power to accelerate or even maintain its speed. The officer may then press the "Stop" button when the vehicle has slowed down sufficiently, or sooner if the suspect makes no attempt to pull over to the side of the road during the slow-down phase. In the stop mode, the control unit 20 will emit a sequence of commands to the vehicle module 10 which will cause the targeted vehicle's four-way flashers to engage and will instantly cut engine power, bringing a quick end to the chase.

As a precaution, particularly if the officer is unable to identify the vehicle being pursued as matching the VIN on the screen 31, he may push the "Flash" button 38 to send out a command to the vehicle with the selected VIN to cause its four-way flashers to turn on. The controller 14 in the vehicle in question will then turn on the flashers 15. If the flashers of the vehicle being pursued turn on, he will be assured that he has control of the desired vehicle. If the flashers do not turn on, it could be an indication that the vehicle being pursued does not have a functioning vehicle module 10 and that the VIN identified belongs to another vehicle.

Once the vehicle is under the control unit's 20 control, it will remain so for a predetermined set time such as 15 to 20 minutes, after which it will disengage and go to the dormant state or until the vehicle module 10 receives another encrypted command signal containing a "Reset" code initiated by pressing the "Reset" button 41. This causes the module 10 to disengage the visual indicator 15 such as the four-way flashers if they are on and re-engage the vehicle control 16 whether it is the ignition system or fuel supply, making the vehicle fully operational once again. There is no way that the vehicle operator can reactivate the vehicle.

On a practical basis, there are many ways to use the present invention. When a police officer begins a pursuit, he sometimes does not have even a basic description of the targeted vehicle, perhaps having had only a fleeting glimpse of disappearing tail lights. The default setting on the control unit 20 for vehicle type is "all" so that its initial signals encompass all vehicles within radio range. If the officer determines that he is chasing a minivan, he may press the "minivan—pickup" key and the control unit 20 will then search for only that type of vehicle by sending out a command signal that only minivans or pickups will respond to. As the pursuit progresses, the officer should input any one or more further vehicle descriptors as he confirms them, thereby constantly helping the control unit 20 to narrow the field of vehicles responding. If he discovers that one of the parameters is incorrect, he need only press the right one and the control unit 20 will continue its search using the new information.

The "color" parameter is one that should be used with the full awareness that it is often unreliable. Many commercial vehicles, i.e. trucks, buses, etc. are repainted with company colors after they leave the factory, and many stolen vehicles are quickly repainted to prevent detection. A vehicle can only be isolated if it matches in every detail the vehicle descriptor parameters that have been given to the control unit 20. If a target vehicle does not respond to control unit 20 signals, the officer should delete the color parameter. If this does not work, and the other descriptors have been accurately entered, the officer may assume that the target vehicle is not equipped with a functioning vehicle module 10 and that he will have to apprehend the fleeing suspect by other means if possible.

In addition to the color buttons 34 and vehicle style buttons 35, the control unit 20 may be programmed to allow the operator to enter other descriptors such as the year, make, model and VIN of the vehicle by typing them in manually using the keyboard 33. As an example, for the year, the control unit would accept the last two numbers, i.e. "98", for the make and model, the first letter of the word, i.e. "F" for Ford and "T" for Tempo. Though this information is scant, it may instantly eliminate most other vehicles in the vicinity. The letter "F" alone will narrow the field to little more than Ford products, thereby eliminating well over half of the vehicles on the road. The letter "T" will further eliminate a large portion of the Ford population, i.e. Escort, Probe, etc. The likelihood of two or more cars answering these minimal descriptors being within 500 ft. of a police vehicle at a particular point in time is remote, which makes it highly probable that the control unit's 20 search will result in an immediate "hit".

In cases where the chase is proceeding much faster than surrounding traffic, the control unit 20 will be able to isolate the constant "repeater" fairly quickly, approximately as long as it takes to gain 500 ft. of distance on all surrounding traffic. This means that the faster the speed, the quicker the interception. Few pursuits should last more than two minutes.

In cases where the targeted vehicle is traveling at or near the speed of surrounding traffic, the system 1 cannot be effective unless the police officer enters as many descriptors of the vehicle as he is aware of. In this situation the polling activities of the control unit 20 may take much longer to isolate a particular vehicle, as many nearby vehicles remain within radio range for a longer period of time and therefore prevent the control unit 20 from isolating a lone repeater. It is imperative that the officer obtain and enter as many identifying features as he can. If he enters several identifying features, the control unit 20 will likely narrow the field instantly. The more information he provides, the quicker the apprehension.

A vehicle may be slowed down or stopped by controlling the vehicle's ignition or fuel system. For example, the vehicle module 20, if connected to the vehicle's ignition, may begin a process whereby it cuts the ignition for approximately ¼ second, reconnects it for approximately ¼ second, then disconnects it for approximately ¼ second, and so on. This has the net effect of having the vehicle run only half the time, with much reduced power. If the module 10 is connected to the vehicle's fuel supply system, it can reduce the electrical power going to the electronic fuel pump, cutting back the amount of fuel reaching the engine so that it will do little more than idle. The engine may be stopped completely by cutting the power to either the ignition or fuel system.

The PCEL system 1 may have other applications in addition to the quick apprehension of suspect vehicles. For instance, the PCEL control unit 20 may continuously broadcast the VIN's contained in a stolen vehicle file with Find and Stop commands. Any vehicle reported stolen entering radio range will thus immediately be immobilized; its four-way flashers will engage and the engine will stop without going through the "slow-down" phase. If the police officer notices the stolen vehicle's immobilization he can take the necessary action to apprehend the occupants. If the vehicle is immobilized out of his view, the vehicle may be abandoned by its occupants before the police officer locates it. When the stolen vehicle receives the "Find" command from the PCEL control unit 20, the vehicle module 10 will emit its VIN and other descriptors. The red light 32 on the PCEL control unit 20 will glow to indicate a "hit" and the vehicle description will be displayed on the display 31 along with a file number and the reason for police interest. The officer can then search the area until he finds the parked vehicle with its four-way flashers on and engine immobilized.

On the other hand, the PCEL control unit 20 may also continuously broadcast the VIN's contained in the suspect vehicle file together with a Find command. The vehicle module 10 of a suspect vehicle will respond to PCEL control unit 20 with its VIN and vehicle descriptors, however the control unit 20 will not issue an intercept command. A red light 32 will show on the panel 30, and a description of the suspect vehicle will show on the display 31 along with a file number and the reason for police interest. The driver of the suspect vehicle will receive no indication that his vehicle is being monitored.

In a further application of this invention, PCEL control unit 20 may include a powerful base station transmitter capable of covering a large geographical area. This base station would continuously broadcast VIN's of vehicles reported stolen, immediately immobilizing them if they were operating anywhere within radio range.

In another application of the above embodiment, the PCEL control unit 20 can be positioned along a highway or other roadway and made to periodically send out "Find" commands. In return, all vehicles with vehicle modules 10 will be activated and will transmit their VIN's and other descriptors to the control unit 20. This application may be used to positively identify all vehicular traffic for the purposes of assessing tolls, counting vehicles, monitoring traffic movement and determining traffic patterns. In addition, all motor vehicles entering restricted areas could be positively identified after which they could be either permitted access or stopped.

Modules 10 could also be used as a platform to enable tracking of vehicles via Global Positioning system (GPS) satellite tracking, or other technical means. The module 10 could be activated by a satellite signal commanding it to transmit its VIN which would be used to identify the vehicle's location. Also, as a further deterrent against vehicle theft, the vehicle module 10 may be provided with a self-test routine which would impede the operation of the vehicle if the module 10 has been tampered with or is not functioning. This may be done through the controller 14 or through an output slot 17 from the processor 12.

Figure 3:
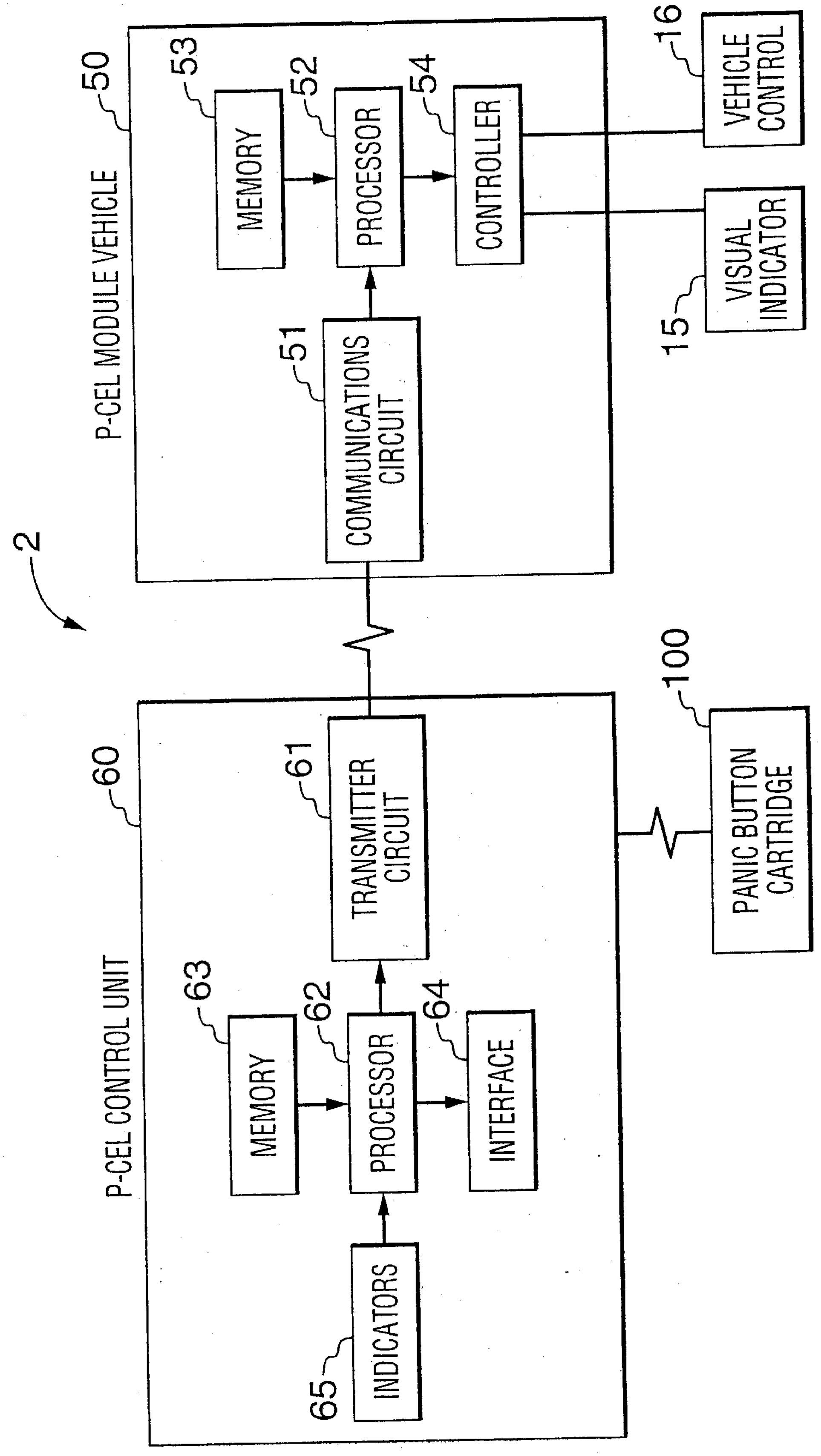
FIG. 3 schematically illustrates a preferred embodiment of a PCEL system with a vehicle module and a control unit in accordance with the present invention.
Figure 4:
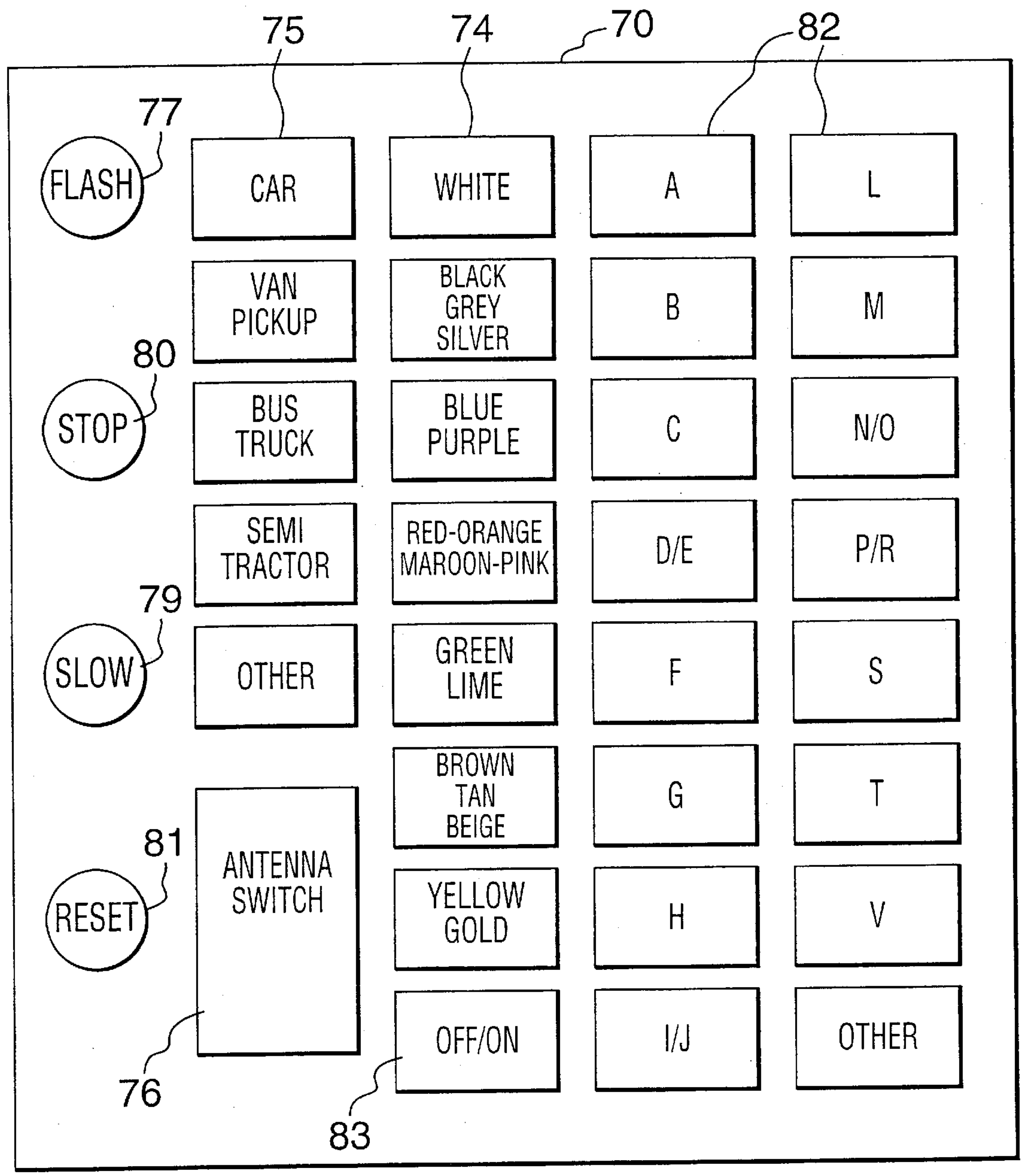
FIG. 4 illustrates a faceplate for the control unit in the FIG. 3 system.

For a PCEL system to operate properly with the vehicles being manufactured in different countries, it is imperative that a universally accepted system be established. In order to do so, it is necessary to develop a standardized vehicle module having a set number of functions such as the vehicle module 10 described with respect to FIG. 1. However, this same requirement does not apply to the control unit used by individual police forces. As an example, FIGS. 3 and 4 schematically illustrate a further embodiment of a control unit 60 in accordance with the present invention.

If vehicle module 50 is to operate in a universal system that uses various type of control units 20, 60 or other, all vehicle modules 10, 50 must have a minimum number of common functions. However, if a module is to operate in a restricted system wherein only control units 60 are used for instance, then it need only have the functions required by the restricted system.

As in the previous embodiment, the PCEL system 2 includes a vehicle module 50 which is a standard module for all vehicles in the system. Module 50 is similar to module 10 described with respect to FIG. 1 and includes a communications circuit 51, a microprocessor 52, a memory 53, and a controller 54. The vehicle module 50 for system 2 may be programmed in the same manner with all of the components of the vehicle module 50 being capable of functioning in the same manner as described with respect to FIG. 1, though in this particular embodiment certain functionality will not be used and may be omitted.

The control unit 60 functions somewhat differently in that it transmits encrypted commands to the vehicle module 50 in a format compatible with the vehicle module 50 but it is incapable of receiving signals back from the vehicle module 50. The control unit 60 includes a transmitter circuit 61 having an antenna, a microprocessor 62, a memory 63, a user interface 64 and indicators 65.

In accordance with the present invention, the control unit 60 has two main functions, the first is to narrow down the number of vehicles with which it is communicating to only the targeted vehicle being pursued and the second is to then communicate control commands to that specific vehicle.

The functions of the control unit 60 in the vehicle control system 2 are represented by the faceplate 70 which is schematically illustrated in FIG. 4. As on the faceplate 30, it includes a power On/Off switch 83, a number of selection keys 74 and 75 for selecting the color or vehicle type respectively for the targeted vehicle and an antenna switch 76 to point a directional antenna in the direction of the targeted vehicle. The seven color keys 74 are identified as black/grey/silver, red/orange/maroon/pink, green/lime, blue/purple, yellow/gold, brown/tan/beige and white; the five vehicle type keys 75 are identified as car, van/pickup, truck/bus, semi-tractor and other.

The faceplate 70 further includes a number of "letter" selection keys 82 which can be used to further limit the selection of vehicles that are asked to respond to the control unit's 60 commands. The keys can represent virtually all of the letters in the alphabet. The key 82 that is pressed will request that all vehicle "makes" starting with that particular letter respond. Thus if an "F" is pressed, all Ford and other makes starting with "F" such as Ferrari will respond.

The faceplate 70 also has a number of control keys including a "Flash" key 77, a "Slow" key 79, a "Stop" key 80 and a "Reset" key 81. The "Flash" key 77 initiates the process of isolating a specific vehicle by sending out a wake-up command as well as a visual indicator 15 command to the vehicle modules 50 of all vehicles in the range of the control unit 60. The vehicle modules 50 respond by becoming activated and by switching on their visual indicator 15 which would generally be the vehicles' four-way flashers. The vehicle module 50 will not respond to any other command if it hasn't first been placed in the "activated" state, and will only remain in the activated state for a predetermined period of time, such as one minute, unless it receives other command signals. The "Slow" key 79 and the "Stop" key 80 send commands to activated vehicle modules 50 within the range of the control unit 60 to cause the activated vehicle(s) to slow down or to stop respectively; these commands are carried out automatically by the controller 54 in the module 50. Again, if the vehicle module 50 doesn't receive a further command from the control unit 60 for a short period, such as one minute, after the "slow" command, the vehicle module 50 will return to its dormant state allowing the vehicle to continue on its way. When a vehicle receives the stop command, it would normally remain disabled for a longer fixed period of time, however in addition or alternately, the control unit 60 may be programmed to send out stop commands periodically to assure that the vehicle remains disabled. The "Reset" key 81 sends out a command to activated vehicle modules 50 within the range of the control unit 60 to return them to their dormant state, wherein the vehicles can be operated normally. The reset command can be sent at any time to release control of the activated vehicle modules.

PCEL system 2 achieves similar results to those of system 1 described earlier in that it allows an enforcement officer to target, pursue and stop a vehicle. However, system 2 isolates and stops the vehicle through one way communications and does not receive signals identifying VIN and other vehicle descriptors of the targeted vehicle.

When a police officer commences a pursuit, he may be aware of certain descriptors of the vehicle being pursued. Using keys 75 for vehicle type, keys 74 for color and/or keys 82 for vehicle make, the officer makes a selection of the group of vehicles to which he wants to transmit commands. He then presses the "Flash" key 77 to transmit a command to all vehicles in the selected group that are in the transmission range of the control unit 60 to activate their vehicle modules 50 and turn on their four-way flashers. All vehicles in the vicinity will receive the command and using their microprocessor 52, will compare the selected group information to the information programmed in their memory 53. Those modules 50 which match every descriptor in the selected group will activate and turn on the vehicle four-way flashers through controller 54. The remaining vehicles which do not match every descriptor will remain in the dormant state. When the police officer sees the four-way flashers of the targeted vehicle functioning he will know that he has made contact, and that he can stop the vehicle at will. What he will then do is observe how many other vehicles in front of him have their four-way flashers on. As he and the targeted vehicle pass other traffic at high speed, the time will come when the targeted vehicle is the only one in front of him with its flashers flashing, all others having been left behind. When that happens, he may press the "Slow" button or the "Stop" button and bring the chase to an end.

With a PCEL system 2, when the police officer initially attempts to make contact with the vehicle being pursued, the only confirmation received by the officer that contact has been made, is the visual signal from the four-way flashers. Until the flashers are made operative, the officer knows that he cannot control the vehicle. Therefore, it is preferable to initially limit the group selected only to the descriptors of which the officer is absolutely certain, for instance the color descriptor would not be selected since the color of the vehicle could have readily been changed. Since the pursued vehicle would normally be going faster than all other vehicles, the other vehicles would be quickly left behind and their vehicle modules 50 would shortly enter the dormant state without further interference. If the officer transmits a command to the targeted vehicle without any descriptor limitations, and the vehicles flashers are not activated, then the officer knows that the vehicle does not carry a functioning vehicle module 50 and another course of action must be taken.

If the targeted vehicle's module 50 is activated as well as those of many other vehicles on the road, and the targeted vehicle is not traveling faster than the surrounding traffic, the officer will continue to transmit "Flash" commands but to an ever more restrictive group of vehicles using the vehicle type keys 74, the color keys 75 and the make keys 82. Once the number of responding vehicles has thus been limited, the officer will slow and/or stop this limited number of vehicles. Once the targeted vehicle has been apprehended, the remaining, if any, vehicles may be released by pressing the "Reset" key 81.

In further embodiments of PCEL control units 20 and 60, the "Flash" keys 38 and 77, the "Slow" keys 39 and 79 and the "Stop" keys 40 and 80 respectively may further be used to cause the control units 20 and 60 to automatically emit commands periodically. For instance, in normal operation, if one of these keys is pressed down for an instant, a single command will be emitted. However, in this further embodiment, if one of the keys is pressed down for a longer time, for example 3 seconds, the command would be emitted periodically, for example every 2 to 5 seconds. In addition, the "Slow" and "Stop" commands would be accompanied by a "Flash" command in order to activate the vehicle modules 10, 50. This embodiment would allow an officer to warn traffic of an emergency and/or control the flow of traffic, and could be used in the following manner.

If an officer wishes to alert traffic to an accident scene or other hazards, he can have his control unit 20, 60 emit the "Flash" commands periodically; all vehicle modules 10, 50 in the vicinity will be activated and will turn on their four-way flashers alerting the drivers themselves as well as oncoming traffic of the hazard.

Alternately, in more extreme situations, if the police officer feels that the oncoming traffic has to be slowed or stopped involuntarily, he can have the control unit 20, 60 emit the "Flash/Slow" or the "Flash/Stop" commands periodically, causing all vehicle modules 10, 50 in the vicinity approaching to engage the vehicles' four-way flashers and slow or stop the vehicles.

Figure 5:
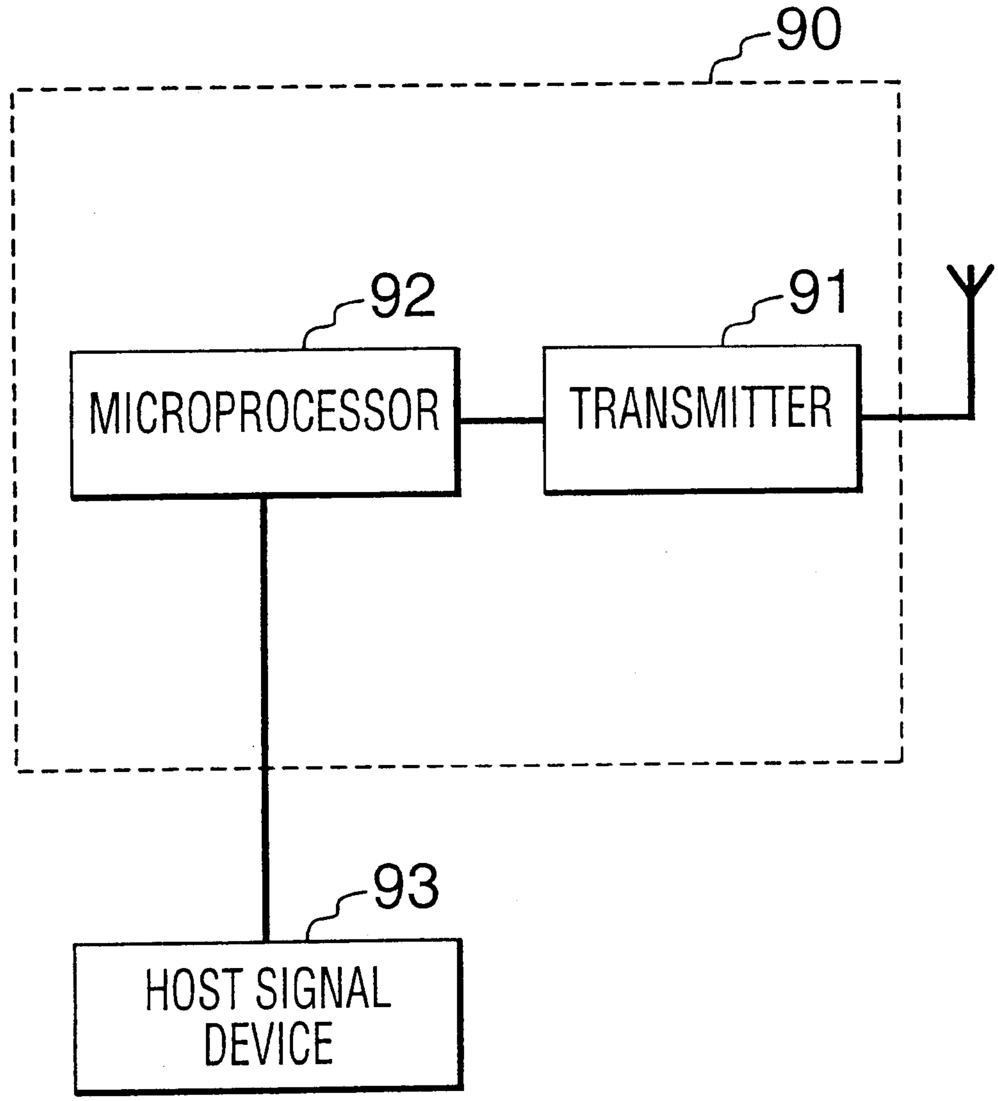
FIG. 5 schematically illustrates a further embodiment of a control unit in accordance with the present invention.

A further embodiment of a control unit in accordance with the present invention is illustrated in FIG. 5. The control unit 90 includes a transmitter 91 with an antenna and a microprocessor 92 which is connected to a signaling device 93. The signalling device may be the warning device at railway crossings or on school buses, or in other applications where it is imperative to warn motorists of a traffic situation. This version consists of a very small, simple transmitter hard wired to existing railway signals or school bus warning devices. Upon activation of the host device, the transmitter 91 will issue "Flash" signals every two seconds to all oncoming traffic, thereby activating the four-way flashers on all approaching vehicles equipped with PCEL modules 10, 50 to serve as a warning to the motorist of the upcoming traffic situation. This embodiment would have numerous additional applications as a traffic warning or control device, and certain applications may require the functionality of the transmitter to be modified to issue "Slow" or "Stop" commands.

Figure 6:
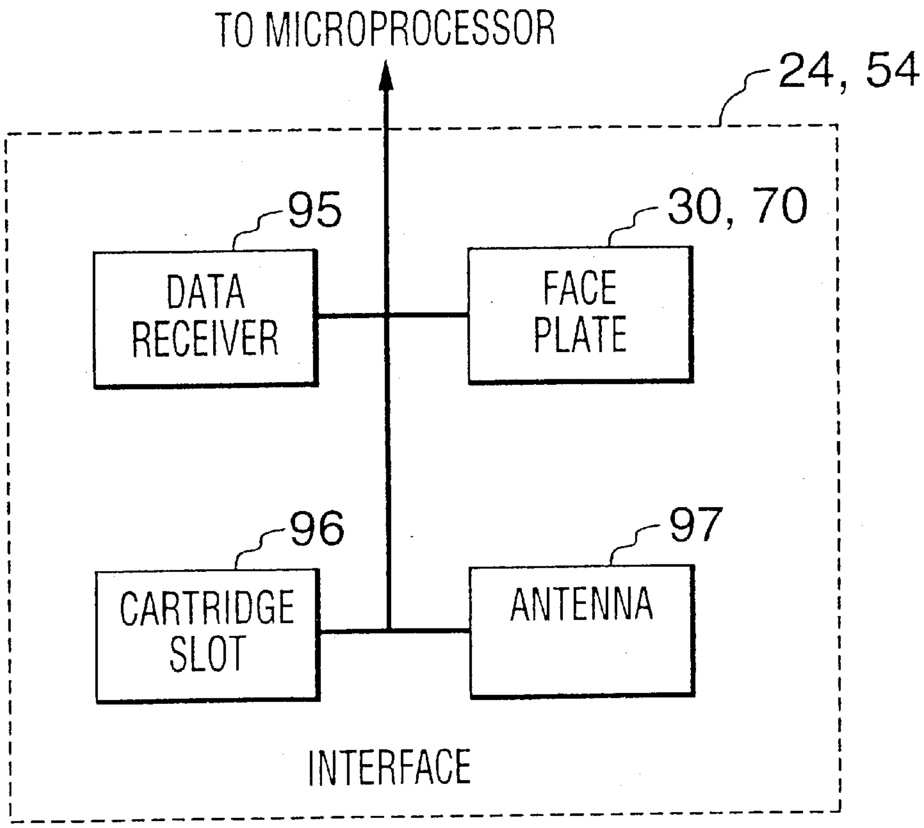
FIG. 6 schematically illustrates the control unit interface in accordance with a further embodiment.

In a further embodiment of the present invention, as illustrated in FIG. 6, the interface 24,54 may, in addition to faceplate 30, 70 respectively, include security devices such as a data receiver 95, a cartridge slot 96 and a small dedicated antenna 97. The data receiver 95 may be a disc reader adapted to accept a disc that is used to store data to be entered into the control unit 20, 60 memory 23, 63 at the beginning of the police officer's shift and to receive data from the control unit 20, 60 at the end of the police officer's shift. It is evident that the data inputted into and downloaded from the control unit 20, 60 could be accomplished in many ways. For example, an exchange of data may be made between the central computer and the control unit 20, 60 in the police station by direct feed before the officer's vehicle leaves and after it gets back, in which case data receiver 95 would simply be a cable coupler. Alternately, the data receiver 95 may be a wireless transceiver for wireless communications through a cell phone system or the internet; data and/or command signals may be communicated between the central computer and the control units 20, 60. During an Officer's shift, it may be desirable to forward new stolen vehicle VIN's to the control unit 20, 60 memory 23, 63. Additionally, signals may be sent to the control unit 20, 60 to control its operation in certain situations such as when one or more police vehicles are at the scene of an accident or when a police vehicle is unoccupied and it is desirable to broadcast VIN's in the area of the vehicle.

Figure 7:
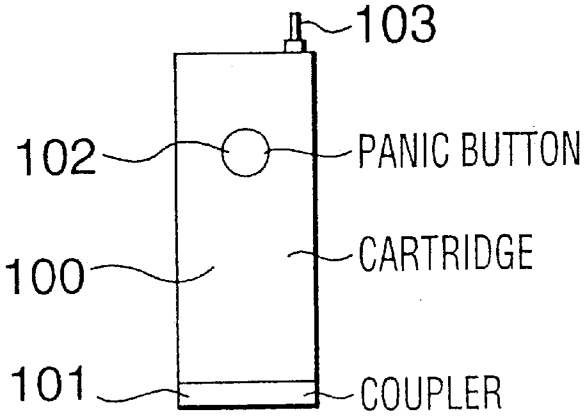
FIG. 7 schematically illustrates a security cartridge in accordance with the present invention.

The cartridge slot 96 is adapted to receive a cartridge 100 which is illustrated schematically in FIG. 7 and includes a coupler 101 for connection to the cartridge slot 96, a panic button 102 and an antenna 103. The cartridge 100 also referred to on FIGS. 1 and 3, further includes a battery operated transmitter circuit that is activated by the panic button 102 to transmit a signal to the control unit 20, 60 antenna 97 to cause the control unit 20, 60 to emit a "Stop" command. Although a dedicated antenna 97 is illustrated, cartridge 100 may communicate with the control unit 20, 60 through the communications circuits 21, 61. The cartridge 100 has further functions in that it must be in place in the cartridge slot 96 in order to make the control unit 20, 60 fully functional and to disable the police vehicle's own vehicle module 10, 50. While the cartridge is missing, the control unit 20, 60 will not respond in any other way until the police officer enters his Personal Identification Number (PIN). Even then, it will only remain operational for a limited period of time such as 15 minutes. This will allow the officer to operate the control unit 20, 60 if he happens to lose the cartridge 100 while outside his vehicle, but he must continually reenter his PIN. This security feature prevents a thief who has stolen the police vehicle from using the PCEL control unit 20, 60. When the cartridge 100 is removed from slot 96, the police vehicle's vehicle module 10, 50 is enabled and may be activated by a command from any other control unit 20, 60. It follows that the cartridge 100 should be removed from the control unit 20, 60 whenever the officer leaves his vehicle unattended.

In order to maintain security and for the proper operation of the control unit 20, 60 in a police vehicle, the following data will be entered into or read from the control unit 20, 60 using the data disc in disc reader 95 or by other means:

(a) A secure access code is loaded into memory 23, 63; and (b) A file which will record all PCEL control unit 20, 60 activities occurring during the police officer's tour of duty.

For vehicles equipped with control unit 20, the disc will further include:

(c) A file containing the VIN's of all vehicles reported stolen or suspect vehicles of interest to police within that geographical area or police jurisdiction; and (d) A file to allow the operator to input any information he wishes to retain for future reference. He may enter vehicle descriptions, suspect names, etc. or simply use it as a daily log.

After inserting the disc, the operator will plug the cartridge 100 into the cartridge slot 96 and then enter his Personal Identification Number (PIN) to start the control unit 20, 60. As a further security measure, it may be desirable to require the officer to reenter his PIN every 3 to 4 hours thereafter. This prevents unauthorized use, which is particularly important if the police vehicle is stolen.

Also as a security measure, all PCEL transmissions will be securely encrypted and encoded to prevent unauthorized use. Each officer may be issued a new data disc at the beginning of each shift. At the end of the shift he will be required to remove the data disc from the control unit 20, 60 and place it in safe storage for future reference or to be used as evidence in legal proceedings.

In order to achieve maximum benefit from the Panic Button cartridge 100 the following process may be followed:

(a) Each time the officer stops a vehicle for a traffic check in a normal manner by visually signaling the driver to pull over, he will enter the body style and color of the vehicle using keys 35, 75 and 34, 74 respectively as well as the make using keyboard 33 or keys 82 into the PCEL control unit 20, 60.

(b) When he has entered the vehicle descriptors, he will push the "Flash" button and wait for the vehicle's four-way flashers to indicate that he has made contact and that the vehicle is equipped with a functioning PCEL module 10, 50. If control is not achieved, he may wish to eliminate color.

(c) Having received this confirmation, he will remove the "Panic Button" cartridge 100 from slot 96 and keep it within easy reach, either in his pocket or clipped on his belt while out of his car.

(d) At the first sign of trouble he can push the red panic button 102 which will transmit a signal to the PCEL control unit 20, 60; control unit 20, 60 will emit a "Stop" command to the vehicle module 10, 50 which will immobilize the targeted vehicle instantly.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A method for remotely controlling a targeted vehicle being pursued through vehicular traffic using a system having a control unit for transmitting activate and control command signals to vehicles in the vicinity of the targeted vehicle and vehicle modules installed in vehicles to produce a vehicle descriptor response to the activate command signal and to control the operation of the vehicle by the control command signals, comprising the steps of:

a. transmitting an activate command signal to the vehicles in the vicinity of the targeted vehicle and receiving vehicle identification responses from the activated vehicles;

b. repeating step a. while following the targeted vehicle until the vehicle identification responses include substantially only one vehicle identification that is common to the repeated series of responses received; and c. controlling the operation of the vehicle having the common identification by a control command signal.

2. A method of remotely controlling a targeted vehicle being pursued through traffic as claimed in claim 1 wherein the vehicle descriptor is selected from VIN, vehicle style, vehicle color and vehicle make.

3. A method of remotely controlling a targeted vehicle being pursued through traffic as claimed in claim 1 wherein:

the activate command signal may include a vehicle "Find" command for seeking a vehicle descriptor response and a vehicle "Flash" command for initiating a vehicle's visual indicator; and the control command signals may include a vehicle "Slow" command for causing the vehicle to slow down, a vehicle "Stop" command for causing the vehicle to stop and a vehicle "Reset" command for resetting the vehicle module.

4. A method for remotely controlling a targeted vehicle being pursued through vehicular traffic using a system having a control unit for transmitting activate and control command signals to vehicles in the vicinity of the targeted vehicle and vehicle modules installed in vehicles to produce a visual response to the activate command signal and to control the operation of the vehicle by the control command signals, comprising the steps of:

a. transmitting an activate command signal to the vehicles in the vicinity of the targeted vehicle and receiving visual responses for a predetermined period of time from the activated vehicles;

b. following the targeted vehicle until it is substantially the only vehicle producing the visual response; and c. controlling the operation of the vehicle by control command signals.

5. A method of remotely controlling a targeted vehicle being pursued through traffic as claimed in claim 4 wherein the visual response from the vehicle comprises the operation of the vehicle flashers.

6. A method of remotely controlling a targeted vehicle being pursued through traffic as claimed in claim 4 wherein the control command signals include a vehicle "Slow" command for causing the vehicle to slow down, a vehicle "Stop" command for causing the vehicle to stop and a vehicle "Reset" command for resetting the vehicle module.

7. A method for remotely controlling vehicles in traffic using a system having a control unit for transmitting activate and control command signals to vehicles in the vicinity of the control unit and vehicle modules installed in vehicles to produce a visual response to the activate command signals and to control the operation of the vehicle by the control command signal, comprising the step of:

a. periodically transmitting activate command signals to the vehicles in the vicinity of control unit to activate visual responses from the vehicles.

8. A method for remotely controlling vehicles in traffic as claimed in claim 7 wherein the visual responses are operating vehicle flashers.

9. A method for remotely controlling vehicles in traffic as claimed in claim 7 which includes the further step:

b. transmitting command control signals to the activated vehicles to control the operation of the vehicles.

10. A method for remotely controlling vehicles in traffic as claimed in claim 9 wherein the control command signal may include a vehicle "Slow" command for causing the vehicle to slow down and a vehicle "Stop" command for causing the vehicle to stop.

11. A method for remotely controlling a targeted vehicle being pursued through traffic using a system having a control unit for transmitting activate and control command signals to vehicles in the vicinity of the targeted vehicle and vehicle modules installed in vehicles to respond to the activate command signal and to control the operation of the vehicle by the control command signals, comprising the steps of:

a. transmitting an activate command signal to the vehicles in the vicinity of the targeted vehicle and receiving responses from the activated vehicles;

b. following the targeted vehicle until it is substantially the only vehicle responding to the activate command signal; and c. controlling the operation of the targeted vehicle by a control command signal.

12. A method of remotely controlling a targeted vehicle being pursued through traffic as claimed in claim 11 wherein the activated vehicle responses include a visual response.

13. A method of remotely controlling a targeted vehicle being pursued through traffic as claimed in claim 11 wherein the activate command signal includes a vehicle "Flash" command for initiating the vehicle visual indicator and control command signals include a vehicle "Slow" command for causing the vehicle to slow down, a vehicle "Stop" command for causing the vehicle to stop and a vehicle "Reset" command for resetting the vehicle module.

14. A method of remotely controlling a targeted vehicle being pursued through traffic as claimed in claim 11 wherein the activated vehicle responses include one or more vehicle descriptors.

15. A method of remotely controlling a targeted vehicle being pursued through traffic as claimed in claim 14 wherein the vehicle descriptors are selected from VIN, vehicle style, vehicle color and vehicle make.

16. A method of remotely controlling a targeted vehicle being pursued through traffic as claimed in claim 11 wherein step (a) includes selecting a group of vehicles in the vicinity of the targeted vehicle.

17. A method of remotely controlling a targeted vehicle being pursued through traffic as claimed in claim 16 wherein the vehicle group is selected by vehicle style, vehicle color and/or vehicle make.

* * * * *